United States Patent Office 3,686,217
Patented Aug. 22, 1972

3,686,217
2-ARYL-2,3,4,5-TETRAHYDRO-1,4-BENZOXAZEPINES
Karl Schenker, Binningen, Switzerland, assignor to Ciba Corporation, New York, N.Y.
Binningen, Switzerland
No Drawing. Continuation-in-part of application Ser. No. 487,313, Sept. 14, 1965. This application Aug. 15, 1967, Ser. No. 660,597
Claims priority, application Switzerland, Sept. 21, 1964, 12,255/64
Int. Cl. C07d 87/54
U.S. Cl. 260—333           12 Claims

ABSTRACT OF THE DISCLOSURE

New compounds of the formula

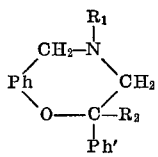

Ph=optionally substituted ortho-phenylene
Ph'=optionally substituted phenyl
$R_1$=optionally substituted hydrocarbon radical of aliphatic character
$R_2$=hydrogen or lower alkyl.

For example: 2-phenyl-4-ethyl-2,3,4,5-tetrahydro-1,4-benzoxazepine.

Use: psychotropic agents and analgesics.

CROSS-REFERENCES TO RELATED APPLICATIONS

This is a continuation-in-part of my copending application Ser. No. 487,313, filed Sept. 14, 1965 and now abandoned.

SUMMARY OF THE INVENTION

The present invention relates to new oxazepines. Especially it concerns 2,3,4,5-tetrahydro-1,4-benzoxazepines of the formula

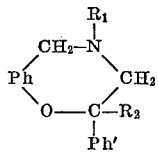

in which Ph represents an ortho-phenylene radical, Ph' a phenyl radical, $R_1$ a hydrocarbon radical of aliphatic character and $R_2$ a hydrogen atom or a lower alkyl radical, and their salts, and the manufacture of these compounds as well as pharmaceutical compositions containing them.

The new benzoxazepines possess valuable pharamacological properties and develop especially a pronounced action on the central nervous system. Thus, in the animal test, for example on cotton rats and monkeys, they produce an aggression-inhibiting effect. Moreover, for example on rats, they are capable of prolonging the duration of a barbiturate narcosis. Furthermore they have an analgesic action. The new compounds can be used as psychotropic agents and as analgesics. They are also suitable for use as intermediates, for example for the manufacture of pharmacologically active compounds.

DESCRIPTION OF THE PREFERRED EMBODIMENTS

The residues Ph and Ph' may be unsubstituted or they may carry one or several substituents. Particularly suitable substituents are lower alkyl radicals, lower alkoxy groups, halogen atoms or trifluoromethyl groups.

The hydrocarbon residue of aliphatic character $R_1$ is above all an alkyl, alkenyl, cycloalkyl or phenylalkyl radical.

Phenylalkyl radicals are above all phenyl-lower alkyls, such as 1- or 2-phenylethyl or benzyl radicals. The phenyl residues in these phenylalkyl radicals may be unsubstituted or substituted, for example as indicated above for the residues Ph and Ph'.

Cycloalkyl radicals are especially cyclopentyl or cyclohexyl residues which may be substituted by lower alkyl groups.

Alkenyl residues are, for example, lower alkenyl residues such as allyl or methallyl residues.

Alkyl radicals are preferably lower alkyl radicals, such as methyl, ethyl, propyl or isopropyl residues, or linear or branched butyl, pentyl, hexyl or heptyl groups which may be linked in any desired position.

Lower alkoxy groups are above all methoxy, ethoxy, propoxy or butoxy groups; suitable halogen atoms are, for example, fluorine, chlorine or bromine atoms.

Special mention deserve the compounds of the formula

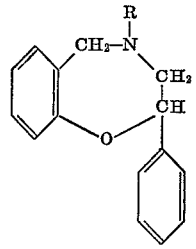

in which R represents an alkyl radical containing 2 to 4 carbon atoms such as an ethyl, propyl or butyl residue, and more especially 2 - phenyl - 4 - (n - butyl) - 2,3,4,5-tetrahydro - 1,4 - benzoxazepine and particularly 2-phenyl-4 - ethyl - 2,3,4,5 - tetrahydro - 1,4 - benzoxazepine, which, for example in the form of the methanesulfonate, on oral administration of 10 to 30 mg./kg. produces in cotton rats a pronounced decrease in the tendency to bite as well as in the reaction to flee, without showing secondary effects as, for example, sedation and paresis.

The new compounds are obtained by known methods.

Preferably, in a tetrahydrobenzoxazepine of the formula

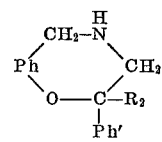

in which Ph, Ph' and $R_2$ have the above meanings—the residue $R_1$ defined above is introduced in position 4.

The residue $R_1$ is introduced in the usual manner, for example by reaction with a compound of the formula $R_1X$ in which X represents a halogen atom or by reductive alkylation, that is to say by reaction with an oxo compound that yields the alcohol $R_1OH$ on reduction, and simultaneous or subsequent reduction of the condensation product obtained in this manner.

The residue X is especially a chlorine, bromine or above all an iodine atom. A particularly suitable reducing agent is catalytically activated hydrogen, such as hydrogen in the presence of a hydrogenating catalyst, such as a nickel or palladium catalyst, or formic acid.

According to another variant of the process for the manufacture of the new compounds in a compound of the formula

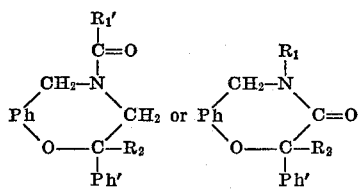

in which $R_1'$—$CH_2$— has the same meaning as $R_1$, and Ph, Ph', $R_1$ and $R_2$ have the above meanings—the oxo group is reduced with lithium aluminum hydride.

Substituents in a resulting compound can be modified according to the final product aimed at. Thus, for example, an unsaturated hydrocarbon residue of aliphatic character can be converted into a saturated hydrocarbon residue, for example an alkenyl into an alkyl radical. This is preferably done by reducing the olefinic double bonds. The reduction is performed in the usual manner, preferably by treatment with hydrogen in the presence of a hydrogenating catalyst, such as a nickel, platinum or palladium catalyst.

Depending on the reaction conditions and starting materials used the final products are obtained in the free form or in the form of their salts which are likewise included in the present invention. The salts of the final products can be converted in the known manner into the free bases, for example with alkalis or ion exchange resins. When the free bases are reacted with organic or inorganic acids, especially those which are capable of forming therapeutically acceptable salts, they form salts. As such acids there may be mentioned, for example, hydrohalic acids, sulphuric and phosphoric acids, nitric and perchloric acid; aliphatic, alcyclic, aromatic and heterocyclic carboxylic and sulfonic acids such as formic, acetic, propionic, succinic, glycollic, lactic, malic, tartaric, citric, ascorbic, maleic, hydroxymaleic and pyruvic acid; phenylacetic, benzoic, para-aminobenzoic, anthranilic, para-hydroxybenzoic, salicyclic or para-aminosalicyclic acid, embonic, methanesulfonic, ethanesulfonic, hydroxyethanesulfonic, ethylenesulfonic acid; halobenzenesulfonic, toluenesulfonic, naphthalenesulfonic acid or sulphanilic acid; methionine, tryptophan, lysine or arginine.

These or other salts of the new compounds, for example the picrates may also be used for purifying the resulting free bases by converting the free base into a salt thereof, isolating the salt and liberating the base from it again. In view of the close relationship between the new compounds in the free form and in the form of their salts, what has been said above and below referring to the free bases, concerns also the corresponding salts wherever this is possible and useful.

The invention includes also any modification of the present process in which an intermediate obtainable at any stage of the process is used as a starting material and any remaining step or steps is/are carried out, or in which the starting materials are formed in situ or the reactants are used in the form of their salts.

The reactions of this invention are advantatgeously carried out with starting materials that give rise to the above-mentioned preferred compounds.

The starting materials are known or, if they are new they can be manufactured by known methods.

The 4-unsubstituted compounds used as starting materials are accessible, for example, by reducing a compound of the formula

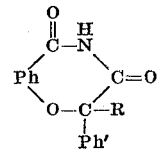

in which Ph, Ph' and R have the meanings given above, with lithium aluminium hydride.

Racemic starting and final products can be resolved into the optical antipodes by known methods, for example thus: The racemic base is dissolved in a suitable inert solvent, reacted with an optically active acid and the resulting salts are separated, for example on the strength of their different solubilities, into the diastereomers, from which the antipodes of the new bases can be liberated with the use of an alkaline agent. Particularly frequently used optically active acids are the D-forms and L-forms of tartaric acid, di-ortho-toluyl-tartaric acid, malic acid, mandelic acid, camphorsulfonic acid or quinic acid. If desired, separation can be achieved by recrystallizing the resulting pure racemate from an optically active solvent. It is of advantage to isolate the more active of the two antipodes.

The new compounds can be used, for example, in the form of pharmaceutical preparations containing them in the free form or in the form of their salts in conjunction or admixture with an organic or inorganic, solid or liquid pharmaceutical excipient suitable for enteral or parenteral administration. Suitable excipients are substances that do not react with the new compounds, for example water, gelatin, lactose, starches, stearyl alcohol, magnesium stearate, talcum, vegetable oils, benzyl alcohols, gums, propylene-glycols, white petroleum jelly, or other known medicinal excipients. The pharmaceutical preparations may be, for example, tablets, dragees or capsules, or in liquid form solutions, suspensions or emulsions. They may be sterilized and/or may contain auxiliaries such as preserving, stabilizing, wetting or emulsifying agents, solution promoters, salts for regulating the osmotic pressure or buffers. They may also contain other therapeutically valuable substances. The pharmaceutical preparations are formulated by a usual method.

The new compounds may also be used in the form of feedstuffs or of additives to feedstuffs, using, for instance, the conventional extenders and diluents or feed-stuffs respectively.

The following examples illustrate the invention.

EXAMPLE 1

A solution of 22.5 g. (0.1 mol) of 2-phenyl-2,3,4,5-tetrahydro-1,4-benzoxazepine in 100 ml. of 98% formic acid is mixed with 10 g. of 40% aqueous Formalin solution (0.125 mol) and heated for 5 hours on a boiling waterbath. The solution is then evaporated under a waterjet vacuum, the residue is taken up in 200 ml. of chloroform and extracted with 100 ml. of N-sodium hydroxide solution and then with 2×50 ml. of water. The chloroform solution is dried over anhydrous sodium sulphate and evaporated. The residual oil furnishes on distillation under a high vacuum 2-phenyl-4-methyl-2,3,4,5-tetrahydro-1,4-benzoxazepine of the formula

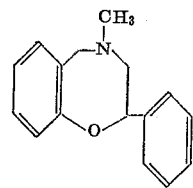

as a colorless oil which boils at 127° to 133° C. under 0.08 mm. Hg pressure.

The base furnishes a crystalline salt with maleic acid, melting at 165° to 167° C. (from acetone).

The 2-phenyl-2,3,4,5-tetrahydro-1,4-benzoxazepine used as starting material can be prepared in the following manner:

A solution of 108 g. (0.427 mol) of 2-phenyl-3,5-dioxo-2,3,4,5-tetrahydro-1,4-benzoxazepine in 1.5 liters of anhydrous tetrahydrofuran is stirred dropwise into a boiling suspension of 39 g. (1.0 mol) of lithium aluminium hydride in 1 liter of tetrahydrofuran. The reaction mixture is then refluxed for 10 hours, cooled, and successively mixed with 40 ml. of water, 40 ml. of 15% sodium hydroxide solution and another 120 ml. of water, and the insoluble matter is suctioned off. The filtrate is evaporated. The residue is taken up in 600 ml. of N-hydrochloric acid extracted with 2× 100 ml. of benzene. The aqueous layer is mixed with a small amount of active carbon, filtered through a folded filter and the clear filtrate is rendered strongly alkaline with concentrated sodium hydroxide solution. Extraction with chloroform produces a viscous oil which is subjected to fraction distillation on a Vigreux-Hickmann column and yields 2-phenyl-2,3,4,5-tetrahydro-1,4-benzoxazepine of the formula

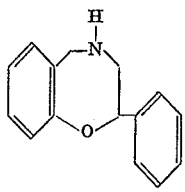

as a pale yellow oil boiling at 128° to 135° C. under 0.12 mm. Hg pressure which, when left to itself, crystallises right through and melts at 79° to 81° C.

The hydrochloride melts at 235° to 237° C. with decomposition after recrystallisation from acetone.

EXAMPLE 2

A solution of 13.35 g. (0.05 mol) of 2-phenyl-4-acetyl-2,3,4,5-tetrahydro-1,4-benzoxazepine in 100 ml. of absolute tetrahydrofuran is stirred dropwise into a boiling suspension of 3.9 g. (0.1 mol) of lithium aluminum hydride in 200 ml. of tetrahydrofuran; the batch is then refluxed for 10 hours and allowed to cool. There are then successively added 4 ml. of water, 4 ml. of 15% sodium hydroxide solution and another 12 ml. of water, and the insoluble matter is suctioned off. The filtrate is evaporated. The residue is taken up in 100 ml. of N-hydrochloric acid and extracted with 2× 30 ml. of benzene. The aqueous layer is mixed with a little active carbon, filtered through a folded filter, and the clear filtrate is rendered strongly alkaline with concentrated sodium hydroxide solution. Extraction with chloroform furnishes a viscous oil which on fractional distillation on a Vigreux-Hickmann column yields 2-phenyl-4-ethyl-2,3,4,5-tetrahydro-1,4-benzoxazepine of the formula

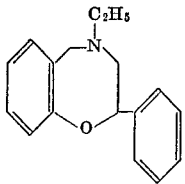

in the form of a colorless oil which boils at 123° C. to 128° C. under 0.05 mm. Hg pressure.

When the maleate of the base is recrystallized from acetone+ethyl acetate, it forms colorless scales melting at 160° to 161° C.

When an acetonic solution of the base is neutralized with methanesulfonic acid, the methanesulfonate is obtained which, after recrystallization from ethanol+ether, melts at 154° to 155° C.

The 2-phenyl-4-acetyl-2,3,4,5-tetrahydro-1,4-benzoxazepine used as starting material can be prepared thus:

A mixture of 11.25 g. (0.05 mol) of 2-phenyl-2,3,4,5-tetrahydro-1,4-benzoxazepine, 50 ml. of acetic anhydride and 10 ml. of anhydrous pyridine is heated for one hour on a water-bath and then evaporated in a water-jet vacuum. The residue is taken up in 150 ml. of chloroform and extracted with 2×30 ml. of 2 N-hydrochloric acid and then with 50 ml. of water. The chloroform solution is dried over anhydrous sodium sulphate and evaporated and the residue recrystallized from ether+petroleum ether, to yield 2-phenyl-4-acetyl-2,3,4,5-tetrahydro-1,4-benzoxazepine in colorless crystals melting at 104° to 106° C.

EXAMPLE 3

A mixture of 8.0 g. (0.035 mol) of 2-phenyl-2,3,4,5-tetrahydro-1,4-benzoxazepine, 7.2 g. (0.046 mol) of ethyl iodide and 15 g. of powdered anhydrous potassium carbonate in 200 ml. of acetone is heated for 4 hours at 25° C. and then for 10 hours at the boil. The batch is then suction-filtered, the filtrate evaporated and the residue taken up in a solution of 10 g. of methanesulfonic acid in 100 ml. of water. The solution is treated with active carbon, filtered and alkalinized with sodium hydroxide solution. Extraction with chloroform furnishes an oily product which on distillation yields 2-phenyl-4-ethyl-2,3,4,5-tetrahydro-1,4-benzoxazepine of the formula

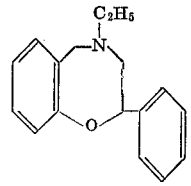

which boils at 122° to 125° C. under 0.05 mm. Hg pressure. This compound is identical with the product described in Example 2.

EXAMPLE 4

A mixture of 11.25 g. (0.05 mol) of 2-phenyl-2,3,4,5-tetrahydro-1,4-benzoxazepine, 20 g. of potassium carbonate and 10 g. (0.059 mol) of propyl iodide in 200 ml. of acetone is boiled for 15 hours while being vigorously stirred. The batch is suctioned-filtered, the filtrate evaporated and the residue taken up in a solution of 15 g. of methanesulfonic acid in 150 ml. of water. The solution is treated with active carbon, filtered and rendered alkaline with sodium hydroxide solution. Extraction with chloroform furnishes an oily product which on distillation yields 2-phenyl-4-propyl-2,3,4,5-tetrahydro-1,4-benzoxazepine of the formula

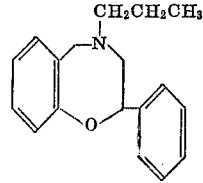

in the form of a colorless viscous liquid which boils at 133° to 140° C. under 0.05 mm. Hg pressure.

The methanesulfonate crystallizes from ethanol+ether in colorless flakes melting at 167° to 168° C.

EXAMPLE 5

A mixture of 10 g. (0.0445 mol) of 2-phenyl-2,3,4,5-tetrahydro-1,4-benzoxazepine, 10.7 g. (0.058 mol) of n-butyl iodide and 19 g. of powdered anhydrous potassium carbonate in 250 ml. of acetone is heated for 4 hours at 25° C. and then for 10 hours at the boil. The batch is suction-filtered, the filtrate evaporated and the residue taken up in a solution of 13 g. of methanesulfonic acid in 130 ml. of water; the solution is treated with active carbon, filtered and rendered alkaline with sodium hydroxide solution. Extraction with chloroform furnishes an oily product which on distillation yields 2-phenyl-4-(n-butyl) - 2,3,4,5 - tetrahydro - 1,4-benzoxazepine of the formula

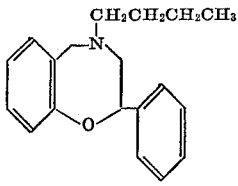

as a yellow viscous oil boiling at 143° to 148° C. under 0.05 mm. Hg pressure.

The methanesulfonate melts at 129° to 131° C.

EXAMPLE 6

A mixture of 11.25 g. (0.05 mol) of 2-phenyl-2,3,4,5-tetrahydro-1,4-benzoxazepine, 12.6 g. (0.075 mol) of isopropyl iodide and 30 g. of finely powdered potassium carbonate in 250 ml. of acetone is stirred and heated for 15 hours. After this time the thin-layer chromatographic examination reveals only traces of starting amine in the reaction mixture. The insoluble salts are filtered off and the filtrate is evaporated. The residue is heated with 50 ml. of acetic anhydride for 1 hour on a water bath, during which any starting amine that has escaped propylation undergoes acetylation. The acetic anhydride is evaporated under a water-jet vacuum, the residue is dissolved in 200 ml. of 0.5 N-hydrochloric acid, extracted with 2×30 ml. of benzene, and the aqueous layer is agitated thoroughly with a small amount of active carbon. The whole is filtered, rendered strongly alkaline and the base is extracted with chloroform, to yield 2-phenyl-4-isopropyl-2,3,4,5-tetrahydro-1,4-benzoxazepine of the formula

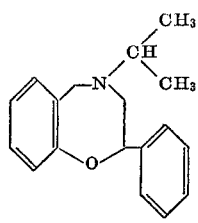

as a colorless oil which boils at 132° to 136° C. under 0.1 mm. Hg pressure.

Its hydrochloride melts at 190° to 191° C.

EXAMPLE 7

A mixture of 7.0 g. (0.031 mol) of 2-phenyl-2,3,4,5-tetrahydro-1,4-benzoxazepine, 12.9 of potassium carbonate, 0.3 g. of potassium iodide and 3.4 g. (0.033 mol) of methallyl chloride in 150 ml. of acetone is stirred and boiled for 15 hours. After this time the thin-layer chromatographic examination reveals only traces of starting amine in the reaction mixture. The insoluble salts are filtered off, and the filtrate is evaporated. The residue is heated with 35 ml. of acetic anhydride for one hour on the water bath, during which any starting amine that has escaped methallylation undergoes acetylation. The acetic anhydride is evaporated under a water-jet vacuum, the residue is dissolved in 140 ml. of 0.5 N-hydrochloric acid, extracted with 2× 20 ml. of benzene, and the aqueous layer is thoroughly agitated with a small amount of active carbon. After filtration, the batch is rendered strongly alkaline with sodium hydroxide solution and the base extracted with chloroform, to yield 2 - phenyl-4- methallyl-2,3,4,5-tetrahydro-1,4-benzoxazepine of the formula

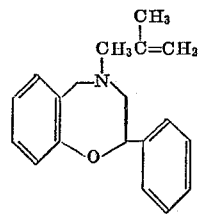

as a yellowish oil which boils at 130° to 137° C. under a pressure of 0.004 mm. Hg.

EXAMPLE 8

14.35 g. (0.05 mol) of 2-phenyl-7-chloro-2,3,4,5-tetrahydro-1,4-benzoxazepine and 50 ml. of acetic anhydride are heated on the water bath for one hour. The batch is rapidly evaporated under a wat-jet vacuum, and the residue dissolved in chloroform. The solution is extracted by agitation with aqueous sodium bicarbonate until the evolution of gas ceases, then washed neutral with water. Drying over sodium sulfate and evaporation of the chloroform yields crude 2-phenyl-4-acetyl-7-chloro-2,3,4,5-tetrahydro-1,4-benzoxazepine which is dissolved in 100 ml. of absolute tetrahydrofuran, and the solution added dropwise to a boiling suspension of 4.0 g.( 0.1 mol) of lithium aluminum hydride in 150 ml. of tetrahydrofuran. The batch is then refluxed for 18 hours. After that, 4 ml. of water, 4 ml. of 15% sodium hydroxide solution, and another 4 ml. of water are added dropwise to the reaction mixture. The insoluble portion is then separated by filtration, and the filtrate evaporated. The residue is dissolved in 200 ml. of chloroform and the solution thoroughly washed with water. The chloroformic solution is dried over sodium sulfate and evaporated to obtain 2-phenyl-4 - ethyl - 7 - chloro - 2,3,4,5 - tetrahydro - 1,4 - benzoxazepine of the formula

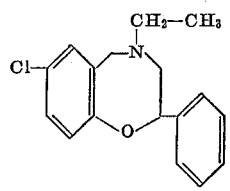

as a colorless oil.

The hydrochloride can be obtained as follows:

The base is dissolved in 5 times its quantity of acetone and the solution neutralized by the addition of a 2 N-solution of hydrogen chloride in ethyl acetate. Dilution with ether follows until the solution begins to become turbid. On cooling, the hydrochloride crystallizes in the form of fine prisms of melting point 223–225° C.

The 2 - phenyl - 7 - chloro - 2,3,4,5 - tetrahydro - 1,4-benzoxazepine used as starting material can be prepared as follows:

17.15 g. (0.1 mol) of 5-chloro-salicyclic acid amide are dissolved in 250 ml. of acetone and stirred while being heated for 15 hours with 18.2 g. (0.115 mol) of ethyl α-chlorophenylacetate, 42 g. of finely ground potassium carbonate and 0.5 g. of potassium iodide. After cooling, the inorganic constituents are filtered off, the filtrate evaporated, and the residue dissolved in 250 ml. of chloroform. The solution is extracted 4 times by agitation with 100 ml. of N-aqueous sodium hydroxide solution each time, and then with 2× 50 ml. of water. The chloroformic solution is dried over sodium sulfate, and evaporated. The crystalline residue (melting point, 135–140° C.) is digested with 50 ml. of ethyl acetate, 50 ml. of petroleum ether are added and after a while, the batch is filtered. In this manner, the ethyl α-phenyl-α-(2'-carbamyl-4'-chlorophenoxy)-acetate of the formula

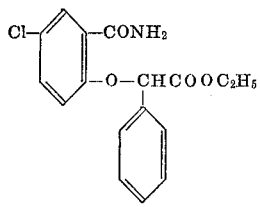

melting at 143–145° C. is obtained.

33.35 g. (0.1 mol) of this ester are dissolved in 100 ml. of ethanol and 250 ml. of methanol and, after the addition of 60 ml. of 2 N-aqueous sodium hydroxide solution (0.12 mol), allowed to stand at 25° C. for 12 hours. The solution is then diluted with 400 ml. of water. It remains clear. On neutralization with 5 N-hydrochloride acid, the α - phenyl-α-(2'-carbamyl - 4'-chlorophenoxy)-acetic acid crystallizes. It is filtered off and the filter residue washed thoroughly with water. The acid melts at 206–208° C.

30.55 g. (0.1 mol) of this acid are heated at a bath temperature of 120° C. with 110 ml. of chlorobenzene and 16 ml. of acetyl chloride in an oil bath. On cooling, the 2-phenyl-3,5-dioxo-7-chloro - 2,3,4,5-tetrahydro-1,4-benzoxazepine crystallizes out. It is filtered off with suction and the filter rinsed well with a 1:1 mixture of ether and petroleum ether. After being recrystallized from ethyl acetate, the product melts at 173–174° C.

A solution of 52 g. (0.18 mol) of 2-phenyl-3,5-dioxo-7-chloro-2,3,4,5-tetrahydro-1,4-benzoxazepine in 500 ml. of tetrahydrofuran is added dropwise to a boiling suspension of 15 g. (0.38 mol) of lithium aluminum hydride in 400 ml. of absolute tetrahydrofuran. The batch is boiled under reflux for another 18 hours. After cooling, there are added successively 15 ml. of water, 15 ml. of 15% sodium hydroxide solution, and another 15 ml. of water. The insoluble constituents are the filtered off with suction, and the filtrate is evaporated. The residue is dissolved in 200 ml. of chloroform and extracted thoroughly by agitation with water. The chloroformic solution is dried over sodium sulfate and evaporated. The 2-phenyl-7-chloro-2,3,4,5 - tetrahydro-1,4-benzoxazepine of the formula

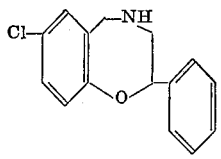

which remains behind as a viscous, colorless oil, is dissolved in 150 ml. of acetone and neutralized with a 2 N-solution of hydrogen chloride in ethyl acetate, the hydrochloride crystallizing in the form of colorless needles of melting point 230–233° C.

EXAMPLE 9

13.0 g. (0.05 mol) of 2-phenyl-7-chloro-2,3,4,5-tetrahydro-1,4-benzoxazepine are dissolved in 150 ml. of acetone and the solution treated with 20 g. of finely ground potassium carbonate and 0.3 g. of potassium iodide. While stirring vigorously, 7.5 g. (0.055 mol) of isobutylbromide are dropped in. The reaction is allowed to proceed for 10 hours at room temperature, and the batch then boiled under reflux for 5 hours. The inorganic material is then filtered off with suction, and the filtrate evaporated. The residue is agitated with a solution of 5 g. of methanesulfonic acid in 200 ml. of water. The small amount of undissolved matter is removed by treatment with active carbon and filtration. The clear filtrate is rendered alkaline with sodium hydroxide solution, and the free base extracted with methylene chloride. The 2-phenyl-4-isobutyl-7-chloro - 2,3,4,5-tetrahydro-1,4-benzoxazepine of the formula

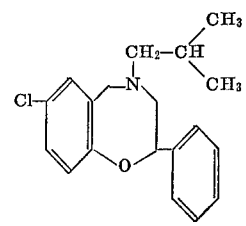

is a nearly colorless, highly viscous oil which on distillation exhibits a boiling point of 140–144° C. under a pressure of 0.06 mm. Hg. After being recrystallized from aectone, the hydrochloride melts at 211–213° C.

EXAMPLE 10

Tablets containing 50 mg. of 2-phenyl-4-ethyl-2,3,4,5-tetrahydro-1,4-benzoxazepine hydrochloride may be prepared with the following ingredients:

| | Per tablet, Mg. |
|---|---|
| 2-phenyl - 4 - ethyl - 2,3,4,5-tetrahydro-1,4-benzoxazepine hydrochloride | 50 |
| Wheat starch | 40 |
| Lactose | 70 |
| Colloidal silicic acid | 10 |
| Arrowroot | 19 |
| Talc | 10 |
| Magnesium stearate | 1 |
| | 200 |

Method

The 2-phenyl-4-ethyl - 2,3,4,5-tetrahydro-1,4-benzoxazepine hydrochloride is mixed with a part of the wheat starch, with lactose and colloidal silicic acid, and the mixture passed through a sieve. The remaining wheat starch is pasted with five times its quantity of water on a water-bath and the powder mixture kneaded with this paste until a slighly plastic mass is formed.

The plastic mass is pressed through a sieve having a mesh of about 3 mm., dried and the dried granulate once more passed through a sieve. The arrowroot, talc and magnesium stearate are then added, and the mixture compressed to form tablets weighing 200 mg.

EXAMPLE 11

26.9 g. (0.1 mol) of 2-(para-chlorophenyl)-2,3,4,5-tetrahydro-1,4-benzoxazepine are heated for 1 hour on a water-bath in 50 ml. of acetic acid anhydride. The reaction mixture is evaporated sharply at a water-jet vacuum and the residue dissolved in chloroform. The solution is extracted with aqueous sodium bicarbonate until the evolution of gas ceases, and then washed neutral with water. The batch is dried over sodium sulfate, the solvent evaporated to leave crude 2-(para-chlorophenyl)-4-acetyl-2,3,4,5-tetrahydro-1,4-benzoxazepine which is dissolved in 150 ml. of absolute tetrahydrofuran and added dropwise to a boiling suspension of 8.0 g. (0.2 mol) of lithium aluminum hydride in 300 ml. of absolute tetrahydrofuran. The batch is then boiled under reflux for 15 hours. After cooling, there are added in succession 8 ml. of water, 8 ml. of sodium hydroxide solution of 15% strength and again 8 ml. of water, and the insoluble constituents are filtered off with suction. The filtrate is evaporated. The resulting viscous oil obtained as residue solidifies on standing to form crystals and is then dissolved in an excess of dilute aqueous methanesulfonic acid to separate off any neutral contaminants. The solution is treated with active charcoal and filtered. From the clear filtrate there are obtained after treatment with alkali and extraction with toluene waxlike clusters having a low melting point. The product is further purified by chromatography on alumina. Elution with benzene yields pure 2-(para-chlorophenyl)-

4-ethyl - 2,3,4,5 - tetrahydro-1,4-benzoxazepine of the formula

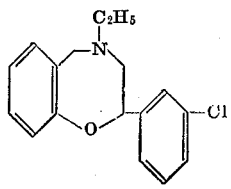

melting at 83–85° C. (from a mixture of ether and petroleum ether).

The hydrochloride melts at 94–96° C. It is readily soluble in water, but also in chloroform or acetone.

The 2-(para-chlorophenyl) - 2,3,4,5 - tetrahydro-1,4-benzoxazepine used as starting material may be prepared as follows:

31.5 g. (0.23 mol) of salicylic acid amide are dissolved in 400 ml. of acetone and boiled for 15 hours with stirring with 53.5 g. (0.23 mol) of α-chloro-α-(para-chlorophenyl)-acetic acid ethyl ester, 63 g. (0.44 mol) of finely ground potassium carbonate and 0.4 g. of potassium iodide. After cooling, the inorganic constituents are filtered off with suction, the filtrate evaporated and the residue taken up in 400 ml. of chloroform. The solution is extracted four times with 100 ml. of ice-cold N aqueous sodium hydroxide solution each time and then twice with water. The chloroform solution is dried over sodium sulfate and evaporated. The solid residue is recrystallized from ethyl acetate to yield α-(ortho-carbamoylphenoxy)-α-(para-chlorophenyl)-acetic acid ethyl ester in the form of colorless crystals melting at 131–132° C.

54.3 g. (0.163 mol) of this compound are dissolved in 160 ml. of methanol and after the addition of 80 ml. of saturated aqueous sodium carbonate solution and 160 ml. of water heated for 3 hours at 100° C. with stirring. After cooling, the clear solution is treated with 75 ml. of 5 N hydrochloric acid, α-(ortho-carbamoyl-phenyl)-α-(para-chlorophenyl)-acetic acid precipitates in crystalline form and is filtered with suction, the filtrate is washed thoroughly with water. After being dried at 80° C. under 80 mm. of pressure the acid melts at 225° C. with decomposition.

49.0 g. (0.16 mol) of this acid are heated in 700 ml. of chlorobenzene and 80 ml. of acetic acid anhydride at 100° C. with stirring. After 2 hours, the reaction temperature is raised to 125° C. and maintained at that level for 12 hours. On cooling, 2-(para - chlorophenyl)-3,5-dioxo-2,3,4,5-tetrahydro - 1,4 - benzoxazepine crystallizes out. The product is filtered with suction and washed thoroughly with a mixture of ether and petroleum ether (1:1). The product melts at 184–185° C.

A solution of 46.0 g. (0.177 mol) of 2-(para-chlorophenyl) - 3,5 - dioxo - 2,3,4,5 - tetrahydro - 1,4 - benzoxazepine in 300 ml. of absolute tetrahydrofuran is added dropwise to a boiling suspension of 17.0 g. (0.43 mol) of lithium aluminum hydride in 700 ml. of absolute tetrahydrofuran under a nitrogen atmosphere. The batch is then boiled under reflux for another 15 hours. After cooling, there are added in succession 17 ml. of water, 17 ml. of sodium hydroxide solution of 15% strength and another 17 ml. of water. The insoluble portion is then filtered off with suction, the filtrate evaporated, the residue taken up in 200 ml. of chloroform and thoroughly extracted with water. The chloroform solution is dried over sodium sulfate. By evaporating the chloroform there is obtained 2-(para-chlorophenyl) - 2,3,4,5 - tetrahydro - 1,4 - benzoxazepine in the form of colorless crystals melting at 121–122° C.

The hydrochloride crystallizes from acetone in the form of colorless prisms melting at 222–223° C.

EXAMPLE 12

A solution of 27 g. of 2-phenyl-4-ethyl-9-methoxy-2,3,4,5-tetrahydro-1,4-benzoxazepin-3-one in 100 ml. of absolute dioxan is added slowly dropwise to a solution of 8 g. of lithium aluminum hydride in 250 ml. of absolute ether. The batch is then boiled under reflux for 8 hours in a nitrogen atmosphere. The reaction mixture is then treated with cooling in succession with 20 ml. of ethyl acetate, 50 ml. of water and 2 N hydrochloric acid until the pH of the aqueous layer is 1. The organic layer is then separated, the hydrochloric acid phase rendered alkaline with concentrated sodium hydroxide solution and the separated base extracted with ether. 2-phenyl-4-ethyl-9-methoxy - 2,3,4,5 - tetrahydro - 1,4 - benzoaxazepine of the formula

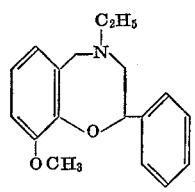

melting at 65–66° C. is obtained; B.P. 142–143° C. under 0.08 mm. pressure of mercury.

The 2 - phenyl - 4-ethyl-9-methoxy-2,3,4,5-tetrahydro-1,4-benzoxazepin-3-one used as starting material may be prepared as follows:

152 g. of 2-hydroxy-3-methoxy-benzaldehyde and 50 g. of ethylamine are dissolved in 200 ml. of isopropanol with cooling. The resulting Schiff's base is hydrogenated directly with hydrogen and 5% palladium carbon or Raney nickel as catalyst under atmospheric pressure and at room temperature.

181 g. of the resulting 2-methoxy-6-(ethylaminomethyl)-phenol is reacted with 198 g. of α-phenyl-α-chloracetyl chloride in 500 ml. of absolute acetone with the addition of 114 g. of triethylamine as acid acceptor at 0 to −5° C. The reaction mixture is stirred for 3 hours at room temperature, boiled under reflux for 1 hour, the solvent removed in a rotary evaporator, and water added, to yield 2-methoxy-6-[N-(α-phenyl-α-chloracetyl)-ethylaminomethyl] - phenol melting at 113–114° C. (from alcohol).

333.5 g. of this product is boiled under reflux together with 166 of potassium carbonate in 400 ml. of absolute acetone overnight, the solvent then removed, water added and the precipitated 2-phenyl-4-ethyl-9-methoxy-2,3,4,5-tetrahydro-1,4-benzoxazepin-3-one extracted with methylene chloride.

EXAMPLE 13

A solution of 36 g. of 2-phenyl-4-(β-phenylethyl)-9-methoxy-2,3,4,5-tetrahydro-1,4-benzoxazepin-3-one in 100 ml. of absolute dioxan is slowly added dropwise to a solution of 8 g. of lithium aluminum hydride in 200 ml. of absolute ether. The reaction mixture is then stirred under reflux for 6 hours under a nitrogen atmosphere. While cooling, the reaction mixture is treated in succession with 20 ml. of ethyl acetate, 50 ml. of water and dilute hydrochloric acid until the aqueous phase shows a pH value of 1. The ethereal layer is then removed, the aqueous phase adjusted to pH 11 with sodium hydroxide solution and the precipitated base extracted with ether. After being distilled twice in a high vacuum there is obtained 2 - phenyl - 4-(β-phenylethyl)-9-methoxy-2,3,4,5-tetrahydro-1,4-benzoxazepine of the formula

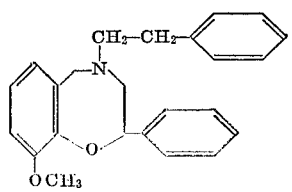

boiling at 190–197° under 0.08 mm. pressure of mercury.

By dissolving the base in absolute acetone and adding the calculated quantity of hydrogen chloride dissolved in ethyl acetate, the crystalline hydrochloride is obtained melting at 205–206° C.

The 2 - phenyl - 4-(β-phenylethyl)-9-methoxy-2,3,4,5-tetrahydro-1,4-benzoxazepin-3-one used as starting material may be prepared in a manner analogous to that described in Example 12, using phenylethylamine in place of ethylamine.

EXAMPLE 14

In a similar manner as described in Examples 1 to 9 and 11 to 13 there may be prepared the 2-(meta-methoxyphenyl) - 2 - methyl-4-(para-fluorobenzyl)-2,3,4,5-tetrahydro-1,4-benzoxazepine, the 2-phenyl-4-cyclopentyl-8 - (trifluoromethyl)-2,3,4,5-tetrahydro-1,4-benzoxazepine and the 2-(meta-trifluoromethyl-phenyl)-4-(ortho-chlorobenzyl)-2,3,4,5-tetrahydro-1,4-benzoxazepine.

I claim:

1. A product selected from the group consisting of compounds of the formula

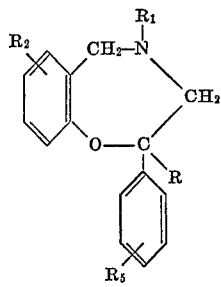

in which R stands for a member selected from the group consisting of hydrogen and lower alkyl, $R_1$ for a member selected from the group consisting of lower alkyl, lower alkenyl, cyclo-lower alkyl, phenyl-lower alkyl and phenyl-lower alkyl substituted by a member selected from the group consisting of lower alkyl, lower alkoxy, halogen and trifluoromethyl, and $R_2$ and $R_5$ each stands for a member selected from the group consisting of hydrogen, lower alkyl, lower alkoxy, halogen and trifluoromethyl, and their acid addition salts.

2. A product as claimed in claim 1, wherein R and $R_5$ stand for hydrogen, $R_1$ for a member selected from the group consisting of lower alkyl and lower alkenyl and $R_2$ for a member selected from the group consisting of hydrogen and chlorine.

3. A product as claimed in claim 1, wherein R, $R_2$ and $R_5$ stand for hydrogen and $R_1$ for alkyl having 2 to 4 carbon atoms.

4. A product as claimed in claim 1, wherein R, $R_1$ and $R_5$ stand for hydrogen and $R_1$ for a member selected from the group consisting of methyl, propyl, isopropyl and methallyl.

5. A product as claimed in claim 1, which product is the 2 - phenyl - 4 - ethyl-2,3,4,5-tetrahydro-1,4-benzoxazepine or a therapeutically acceptable acid addition salt thereof.

6. A product as claimed in claim 1, which product is the 2 - phenyl - 4 - (n-butyl)-2,3,4,5-tetrahydro-1,4-benzoxazepine or a therapeutically acceptable acid addition salt thereof.

7. A product as claimed in claim 1, which product is the 2 - phenyl - 4 - ethyl-7-chloro-2,3,4,5-tetrahydro-1,4-benzoxazepine or a therapeutically acceptable acid addition salt thereof.

8. A product as claimed in claim 1, which product is the 2 - phenyl - 4 - isobutyl-7-chloro-2,3,4,5-tetrahydro-1,4-benzoxazepine or a therapeutically acceptable acid addition salt thereof.

9. A product selected from the group consisting of compounds of the formula

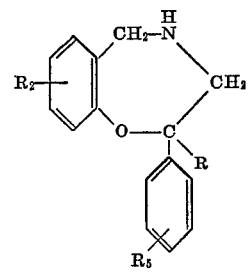

in which R stands for a member selected from the group consisting of hydrogen and lower alkyl and $R_2$ and $R_5$ each stands for a member selected from the group consisting of hydrogen, lower alkyl, lower alkoxy, halogen and trifluoromethyl, and their acid addition salts.

10. A product as claim in claim 9, wherein R and $R_5$ stand for hydrogen and $R_2$ stands for a member selected from the group consisting of hydrogen and chlorine.

11. A product as claimed in claim 9, which product is the 2 - phenyl - 7 - chloro-2,3,4,5-tetrahydro-1,4-benzoxazepine or an acid addition salt thereof.

12. A product as claimed in claim 9, which product is the 2 - phenyl - 2,3,4,5 - tetrahydro-1,4-benzoxazepine or an acid addition salt thereof.

References Cited

UNITED STATES PATENTS

| | | | |
|---|---|---|---|
| 2,807,628 | 9/1957 | Belleau | 260—333 |
| 3,346,565 | 10/1967 | Testa et al. | 260—333 X |

FOREIGN PATENTS

| | | | |
|---|---|---|---|
| 1,459,098 | 10/1966 | France | 260—333 |

NORMA S. MILESTONE, Primary Examiner

U.S. Cl. X.R.

260—471 A; 424—244

PO-1050
(5/69)

UNITED STATES PATENT OFFICE
CERTIFICATE OF CORRECTION

Patent No. 3,686,217          Dated August 22, 1972

Inventor(s) KARL SCHENKER

It is certified that error appears in the above-identified patent and that said Letters Patent are hereby corrected as shown below:

Assignee should read:

CIBA-GEIGY Corporation

Column 13, claim 4, line 1, "$R_1$" should be --- $R_2$ ---.

Signed and sealed this 1st day of January 1974.

(SEAL)
Attest:

EDWARD M. FLETCHER, JR.
Attesting Officer

RENE D. TEGTMEYER
Acting Commissioner of Patents